United States Patent Office 2,889,362
Patented June 2, 1959

2,889,362

SEPARATION OF FUMAROPIMARIC ACID FROM FUMARIC-MODIFIED ROSIN PRODUCTS

Noah J. Halbrook and Ray V. Lawrence, Lake City, Fla., assignors to the United States of America as represented by the Secretary of Agriculture No Drawing. Application January 10, 1957
Serial No. 633,507

6 Claims. (Cl. 260—514.5)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the separation of fumaropimaric acid from fumaric-modified rosin products and has among its objects obtaining of the fumaropimaric acid in a substantially pure form, and the recovery of other valuable constituents.

Fumaric acid reacts with rosin, which contains a mixture of the abietic type acids, and other acids, to form a product commonly known as fumaric-modified rosin. Fumaric-modified rosin is a mixture of modified rosin acids. One of the major constituents is fumaropimaric acid. Technically, fumaropimaric acid is levopimaric 6,14-endosuccinic acid. This crystalline tribasic acid, when pure, has a melting point of 275–276° C., specific rotation $[\alpha]_D^{25}+42.7°$. It is the Diels-Alder addition product produced when fumaric acid is reacted with levopimaric acid.

The fumaric-modified rosin product which is the raw material for the present process may be prepared by reacting fumaric acid with rosin, or other mixtures containing abietic type acids including levopimaric acid, neobietic acid, palustric acid, and abietic acid, at a temeprature of 85–250° C. until the reaction is completed. The reaction under the above conditions normally requires from one to four hours, depending upon the reaction temperature.

The reaction should not be unnecessarily prolonged, however, since the fumaropimaric acid can be converted to the anhydride as a result of prolonged heating at the higher temperatures in which case separation of the fumaropimaric acid by the process of the invention is not possible. Formation of the anhydride can be measured by differences in the acid number as determined in ethyl alcohol solution and in 80% acetone-water solution, titrating the sample with aqueous alkali using phenolphthalein as the indicator. Using the above described method of measuring, acid numbers of 283–285 are obtained in ethyl alcohol solution and an acid number of 418 is obtained in acetone-water solution for the anhydride. Fumaropimaric acid has the same acid number (402) in either acetone or alcohol.

According to this invention, fumaropimaric acid is separated from the fumaric-modified rosin product in the form of a hydrate. Different hydrates may be formed. However, the hemihydrate is the one obtained when the crystalline material is purified and dried at 100° C. in vacuum for three hours. This hydrate has an acid number of 395 in either acetone or alcohol. It may be converted to the anhydrous acid by heating in vacuum at 150° C. for six hours. (The anhydrous acid differs from the hydrate in that it is more soluble in aromatic and chlorinated hydrocarbons, such as benzene, toluene, xylene and chloroform.)

In general, according to the invention, the hydrate of fumaropimaric acid is obtained by dissolving the fumaric-modified rosin product in an aromatic or chlorinated hydrocarbon water-immiscible solvent in which fumaropimaric acid is soluble but the hydrate is insoluble, such as benzene, toluene, xylene or chloroform. It may be desirable to heat the solution to obtain a complete dissolving of the fumaric-modified product. The solution is then contacted with water which results in formation and precipitation of the crystallized hydrate. In case of the aromatic hydrocarbons is used as a solvent, the solution is washed with water, which removes unreacted fumaric acid and causes the precipitation of the hydrate of fumariopimaric acid in the solvent. The precipitated hydrate may be separated from the solvent and further purified in any desired manner. In case technical grade chloroform is used, the water washing step may be omitted since there is enough water present to allow formation of the hydrate of fumaropimaric acid. The hydrate spontaneously crystallizes in the mother liquor if allowed to stand.

During the reaction of fumaric acid with rosin to form the fumaric-modified rosin product, a fumaric-modified rosin acid addition product different than that obtainable as the crystalline hydrate of the fumaropimaric acid is also formed. This different addition product is difficult to obtain in crystalline form and differs from fumaropimaric acid in that it is soluble in the above mentioned aromatic or chlorinated hydrocarbon solvents in the presence of water.

This different fumaric-modified rosin acid addition product can be extracted from a solution thereof with an aqueous solution of sodium bicarbonate. It can be separated from the sodium bicarbonate solution by acidification and extraction with ether.

The following examples exhibit the invention in greater detail.

Example I

Two hundred parts of gum rosin (acid number 164, softening point by ball and ring method, 76° C.) was heated with stirring in a closed flask and under an inert atmosphere. When the temperature of the flask contents reached 200° C., 60 parts of fumaric acid was added and the temperature maintained at 200° C. for 2 hours. The contents of the flask were then poured out and cooled to room temperature. The fumaric-modified rosin obtained in this manner had an acid number of 322 in alcohol solution and 332 in acetone-water solution, a softening point by the ball and ring method of 153° C., and a color grade of WG.

Fifty grams of the fumaric-modified rosin was dissolved in 200 ml. of benzene, washed three times with hot water, and the resulting precipitate removed from the benzene by filtration. The precipitate was then slurried with 50 ml. of benzene and refiltered. A yield of 11.7 g. of the hydrate of fumaropimaric acid with acid number 370 and specific rotation $[\alpha]_D^{25}+39.6°$ was obtained. All rotations reported herein were determined on a 2% solution of the product in absolute alcohol. The hydrate obtained as above was further purified by crystallization from benzene and chloroform solvents to give a product that had an acid number of 402, a melting point of 275–276° C., and a specific rotation $[\alpha]_D^{25}+42.7°$. The theoretical acid number of the pure acid is 402.

Following removal of the crystalline hydrate of fumaropimaric acid evaporation of the solvent from the remaining benzene solution yielded a non-crystalline rosin product of acid number 264.5, softening point by the ball and ring method 148° C. A quantity of this non-crystalline material was dissolved in benzene and the solution was washed with 5% aqueous sodium bicarbonate, The sodium bicarbonate solution was acidified and extracted with ether. The ether solution on evaporation yielded a non-crystalline product which had an acid number of 357, a melting point of 170–179° C. with decomposition, and a specific rotation $[\alpha]_D^{25}+38.0°$.

This non-crystalline tribasic acid may be left in the rosin residue after removal of the crystalline hydrate of fumaropimaric acid. If allowed to remain in the residue a non-crystalline fumaric-fortified rosin residue is obtained enhanced in value over the original rosin for use in paper size, surface coatings and printing ink formulation.

Example II

Two hundred parts of gum rosin (acid number 164) softening point 76° C. was heated with stirring in a closed flask. When the temperature of the contents of the flask reached 200° C., 40 parts of fumaric acid was added and the temperature maintained at 200° C. for two hours. The reaction product was then removed from the flask and cooled to room temperature. The resulting fumaric-modified rosin had the following characteristics: acid number in alcohol 281, acid number in acetone 290, softening point by ball and ring method 142° C., color grade N.

Fifty grams of the fumaric-modified rosin prepared as described in this example was dissolved in 200 ml. of toluene, washed three times with hot water and the resulting precipitate removed from the toluene by filtration. The filtered precipitate was slurried with 50 ml. of toluene and refiltered. A yield of 10.0 g. of the hydrate of fumaropimaric acid, having an acid number of 389 in alcohol and a specific rotation $[\alpha]_D^{25}+40.6°$ was obtained.

Example III

Twenty-five grams of fumaric-modified rosin prepared as in Example I was dissolved in 100 ml. of xylene, washed five times with hot water and the resulting precipitate removed from the xylene by filtration. The filtered precipitate was slurried with 50 ml. of xylene and refiltered. A yield of 5.0 g. of the hydrate of fumaropimaric acid was obtained. The hydrate had an acid number of 392 in alcohol and a specific rotation $[\alpha]_D^{25}+41.3°$.

Example IV

Fifty grams of the fumaric-modified rosin prepared as described in Example I was dissolved in 150 ml. of dry benzene. This solution was sealed in a glass container and allowed to stand for six months with occasional shaking. No crystals formed during this six months period. At this time the container was opened and the solution shaken thoroughly with 150 ml. of warm water. A good yield of the crystalline hydrate of fumaropimaric acid separated almost immediately. The crystalline product, after filtering, washing thoroughly with benzene and drying at room temperature, had an acid number of 382 and $[\alpha]_D^{25}+39°$. After one recrystallization from chloroform this crystalline hydrate of fumaropimaric acid had an acid number of 394 and $[\alpha]_D^{25}+41.7°$.

Example V

A solution of 33 g. of oleoresin and 9.9 g. of fumaric acid in 66 ml. of ethyl alcohol was refluxed at 85° C. The rate of reaction, as measured by the amount of water soluble acid present, was quite rapid and was essentially complete by the time the flask contents had reached reflux temperature. The flask contents were kept at reflux temperature for 8 hours following which time the contents were removed from the flask and cooled to room temperature.

Two hundred milliliters of benzene was added to the reaction product and the resulting solution washed six times with 100 ml. portions of hot water for the purpose of removing alcohol and unreacted fumaric acid. A yield of 6.2 g. of the hydrate of fumaropimaric acid was obtained. The hydrate had the following characteristics: acid number in alcohol 360, specific rotation $[\alpha]_D^{25}+37.9°$, melting point 258–260° C. A single recrystallization of the product from chloroform produced a yield of 5 g. of crystals. This purified product had an acid number of 399 and specific rotation $[\alpha]_D^{25}+40.20°$.

Example VI

Fifty grams of the fumaric-modified rosin prepared as described in Example I, was dissolved in 150 ml. of chloroform, a technical grade containing about 0.20% water. After two days, crystallization started and was allowed to continue for two weeks. The crystals were then removed from the chloroform solution by filtration and washed with a 50 ml. portion of chloroform. A yield of 12 g. of hydrate of fumaropimaric acid which had an acid member of 392 and a specific rotation $[\alpha]_D^{25}+39.2°$ was obtained.

Example VII

Fumaric-modified rosin was prepared as described in Example I, except that wood rosin was substituted for gum rosin. Fifty grams of the reaction product was dissolved in 200 ml. of benzene, washed three times with hot water and the resulting precipitate removed from the mother liquor by filtration. The filtered precipitate was then slurried with 50 ml. of benzene and refiltered. Hydrate of fumaropimaric acid in a yield of 8.0 g. was obtained. The acid number of the product was 373 and the specific rotation $[\alpha]_D^{25}+38.7°$.

We claim:

1. A process of preparing fumaropimaric acid comprising reacting fumaric acid with rosin to produce a fumaric-modified rosin, dissolving the fumaric-modified rosin in a water-immiscible solvent in which fumaropimaric acid is soluble but its hydrate is insoluble, selected from the class consisting of benzene, toluene, xylene, and chloroform, contacting the solution with water to form the hydrate of fumaropimaric acid, and separating the formed crystallized hydrate from the solution.

2. A process of separating fumaropimaric acid from a fumaric-modified rosin product formed by reacting fumaric acid with a mixture containing levopimaric acid, neoabietic acid, palustric acid, and abietic acid, comprising dissolving the fumaric-modified rosin product in a water-immiscible solvent in which fumaropimaric acid is soluble but its hydrate is insoluble, selected from the class consisting of benzene, toluene, xylene, and chloroform, contacting the solution with water to form the hydrate of fumaropimaric acid, and separating the formed crystallized hydrate from the solution.

3. A process of separating fumaropimaric acid from a fumaric-modified rosin product formed by reacting fumaric acid with a mixture containing levopimaric acid, neoabietic acid, palustric acid, and abietic acid, comprising dissolving the fumaric-modified rosin product in benzene, washing the solution with water to form the hydrate of fumaropimaric acid, and separating the formed crystallized hydrate from the washed benzene solution.

4. A process of separating fumaropimaric acid from a fumaric-modified rosin product formed by reacting fumaric acid with a mixture containing levopimaric acid, neoabietic acid, palustric acid, and abietic acid, comprising dissolving the fumaric-modified rosin product in toluene, washing the solution with water to form the hydrate of fumaropimaric acid, and separating the formed crystallized hydrate from the washed toluene solution.

5. A process of separating fumaropimaric acid from a fumaric-modified rosin product formed by reacting fumaric acid with a mixture containing levopimaric acid, neoabietic acid, palustric acid, and abietic acid, comprising dissolving the fumaric-modified rosin product in xylene, washing the solution with water to form the hydrate of fumaropimaric acid, and separating the formed crystallized hydrate from the washed xylene solution.

6. A process of separating fumaropimaric acid from a fumaric-modified rosin product formed by reacting fumaric acid with a mixture containing levopimaric acid, neoabietic acid, palustric acid, and abietic acid, comprising dissolving the fumaric-modified rosin product in chloroform containing water to form the hydrate of fumaropimaric acid, allowing the formed hydrate to crystallize therein, and separating the crystallized hydrate from the solution.

References Cited in the file of this patent

UNITED STATES PATENTS 2,517,563   Harris _____ Aug. 8, 1950